US006882703B2

(12) United States Patent
Price et al.

(10) Patent No.: US 6,882,703 B2
(45) Date of Patent: Apr. 19, 2005

(54) ELECTRON SOURCE AND CABLE FOR X-RAY TUBES

(75) Inventors: John Scott Price, Wauwatosa, WI (US); Karl Francis Sherwin, Waukesha, WI (US); Kasegn Dubale Tekletsadik, New Berlin, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 10/064,624

(22) Filed: Jul. 31, 2002

(65) Prior Publication Data

US 2004/0022360 A1 Feb. 5, 2004

(51) Int. Cl.[7] .............................. H05G 1/10; G02B 6/44

(52) U.S. Cl. .......................... 378/91; 378/101; 378/106; 378/121; 385/101

(58) Field of Search .............................. 378/64, 65, 91, 378/101, 105, 106, 119, 121, 136; 385/101; 307/51

(56) References Cited

U.S. PATENT DOCUMENTS 5,008,912 A * 4/1991 Farrall et al. ................. 378/91
5,428,658 A * 6/1995 Oettinger et al. ........... 378/119
5,557,698 A * 9/1996 Gareis et al. ............... 385/101
5,793,223 A * 8/1998 Frankeny ..................... 326/30
5,875,228 A 2/1999 Truszkowska .............. 378/144
6,319,188 B1 * 11/2001 Lovoi ............................ 600/3
6,320,935 B1 * 11/2001 Shinar et al. ............... 378/119
6,324,257 B1 * 11/2001 Halavee ....................... 378/121
6,418,191 B1 * 7/2002 Fehre et al. ................ 378/105
6,463,124 B1 * 10/2002 Weisman et al. ........... 378/136
6,480,568 B1 * 11/2002 Dinsmore ..................... 378/65
6,516,048 B1 * 2/2003 Mori ........................... 378/119
6,738,275 B1 * 5/2004 Beland ......................... 363/71

OTHER PUBLICATIONS

Fawwaz T. Ulaby. Fundamentals of Applied Electromagnetics, 1999 Edition (New Jersey: Prentice–Hall, 1999), p. 47–66.*

* cited by examiner

*Primary Examiner*—Allen C. Ho
(74) *Attorney, Agent, or Firm*—Cantor Colburn LLP

(57) ABSTRACT

A system and method for providing pulsed power application for an x-ray tube that comprises an x-ray tube having an anode and cathode; and a power supply adapted to provide an anode-to-cathode gap accelerating potential and photons, wherein the gap voltage and photons are pulsed and received by the x-ray tube via a single cable from the power supply resulting in a pulsed x-ray radiation.

30 Claims, 6 Drawing Sheets

ELECTRON SOURCE AND CABLE FOR X-RAY TUBES

BACKGROUND OF INVENTION

The x-ray tube has become essential in medical diagnostic imaging, medical therapy, and various medical testing and material analysis industries. Typical x-ray tubes are built with a rotating anode structure that is rotated by an induction motor comprising a cylindrical rotor built into a cantilevered axle that supports the disc shaped anode target, and an iron stator structure with copper windings that surrounds the elongated neck of the x-ray tube that contains the rotor. The rotor of the rotating anode assembly being driven by the stator which surrounds the rotor of the anode assembly is at anodic potential while the stator is referenced electrically to ground. The x-ray tube cathode provides a focused electron beam which is accelerated across the anode-to-cathode vacuum gap and produces x-rays upon impact with the anode target. The target typically comprises a disk made of a refractory metal such as tungsten, molybdenum or alloys thereof, and the x-rays are generated by making the electron beam collide with this target, while the target is being rotated at high speed. High speed rotating anodes can reach 9,000 to 11,000 RPM.

Only a small surface area of the target is bombarded with electrons. This small surface area is referred to as the focal spot, and forms a source of x-rays. Thermal management is critical in a successful target anode, since over 99 percent of the energy delivered to the target anode is dissipated as heat, while significantly less than 1 percent of the delivered energy is converted to x-rays. Given the relatively large amounts of energy which are typically conducted into the target anode, it is understandable that the target anode must be able to efficiently dissipate heat. The high levels of instantaneous power delivered to the target, combined with the small size of the focal spot, has led designers of x-ray tubes to cause the target anode to rotate, thereby distributing the thermal flux throughout a larger region of the target anode.

When considering the performance of x-ray tubes, some of the issues of importance are x-ray generation efficiency, patient dose management, high voltage stability, selective spectral content, detector response time and speed of image acquisition.

Present x-ray tube design has an efficiency of around 1 percent, with the remaining power input being dissipated as heat. Large tube targets and accompanying structures are necessary to accommodate this power. Presently, the x-ray tube is powered by two sources, one for heating the filament and the other for supplying the high voltage (HV) accelerating potential across the anode-to-cathode gap. These power sources, whether AC or DC, provide a constant power to the tube resulting in a constant output. This method results in power being dissipated during times when there are no x-rays being generated, or during times when the generated x-rays are not needed or utilized.

It is recognized that using a source of high voltage in a pulsed or resonant method will increase the overall efficiency of the x-ray tube. When the accelerating voltage is generated using a pulsed high voltage supply, the dielectric strength of the insulation system is dependent on the duration of the voltage pulse, i.e. insulators have a higher dielectric strength for short duration pulses. This effect is well-known and reflected in corresponding Voltage-Time Characteristic Curves. These curves apply to most dielectric materials and indicate a voltage that the material can withstand, the breakdown voltage, $V_{BD}$, that is not constant with respect to the time duration of the application of the high voltage. The Voltage-Time Characteristic Curves reflect that for the same geometry or dielectric spacing, a higher voltage can be applied over short periods of time. Alternatively, the curves reflect that for a given voltage level the spacing or thickness of the dielectric material can be reduced. Thus, in general, the use of pulsed power technology enables the use of smaller HV critical components as compared to DC high voltage application.

The power source for the filament needs to be a more constant source due to the slow thermal response time of the filament structure. This results in a low efficiency application of power and the attendant use of large wires to handle the filament current.

The overall size of the tube is generally a result of the maximum power required. In cases where small focal spots are more important than power, the size of the tube can be made smaller, but is limited by the size of the HV cables. This limits the tube to being hard mounted in a fixture, limiting its usefulness in accessing difficult areas of the anatomy.

Thus, a method and apparatus is desired to eliminate unnecessary electron generation when the electrons are not needed or have a minimum effect on image quality based on the detector response time or the speed of image acquisition. Furthermore, it is desired to reduce the power requirements and thus the cabling size to an x-ray tube and high voltage components therein necessary for electron generation.

SUMMARY OF INVENTION

The above discussed and other drawbacks and deficiencies are overcome or alleviated by a method to reduce the size of a power cable supplying an x-ray tube is disclosed. The method includes employing an optical waveguide to transfer optical energy to an electron source triggered by photon energy to initiate release of electrons; configuring an accelerating potential conductor taking into account skin effect to reduce the thickness thereof and circumferentially disposing about the waveguide; and disposing an insulating material between the conductor and waveguide, the insulation material surrounding the conductor and the periphery of the waveguide.

In an exemplary embodiment, a pulsed power application system for an x-ray tube having an anode and cathode; and a power supply adapted to provide an anode-to-cathode gap accelerating potential and photon energy, wherein the gap voltage and photon energy are pulsed and received by the x-ray tube via a single cable from the power supply resulting in a pulsed x-ray radiation.

The above discussed and other features and advantages of the present invention will be appreciated and understood by those skilled in the art from the following detailed description and drawings.

BRIEF DESCRIPTION OF DRAWINGS

Referring to the exemplary drawings wherein like elements are numbered alike in the several Figures.

DETAILED DESCRIPTION

Figure 1:
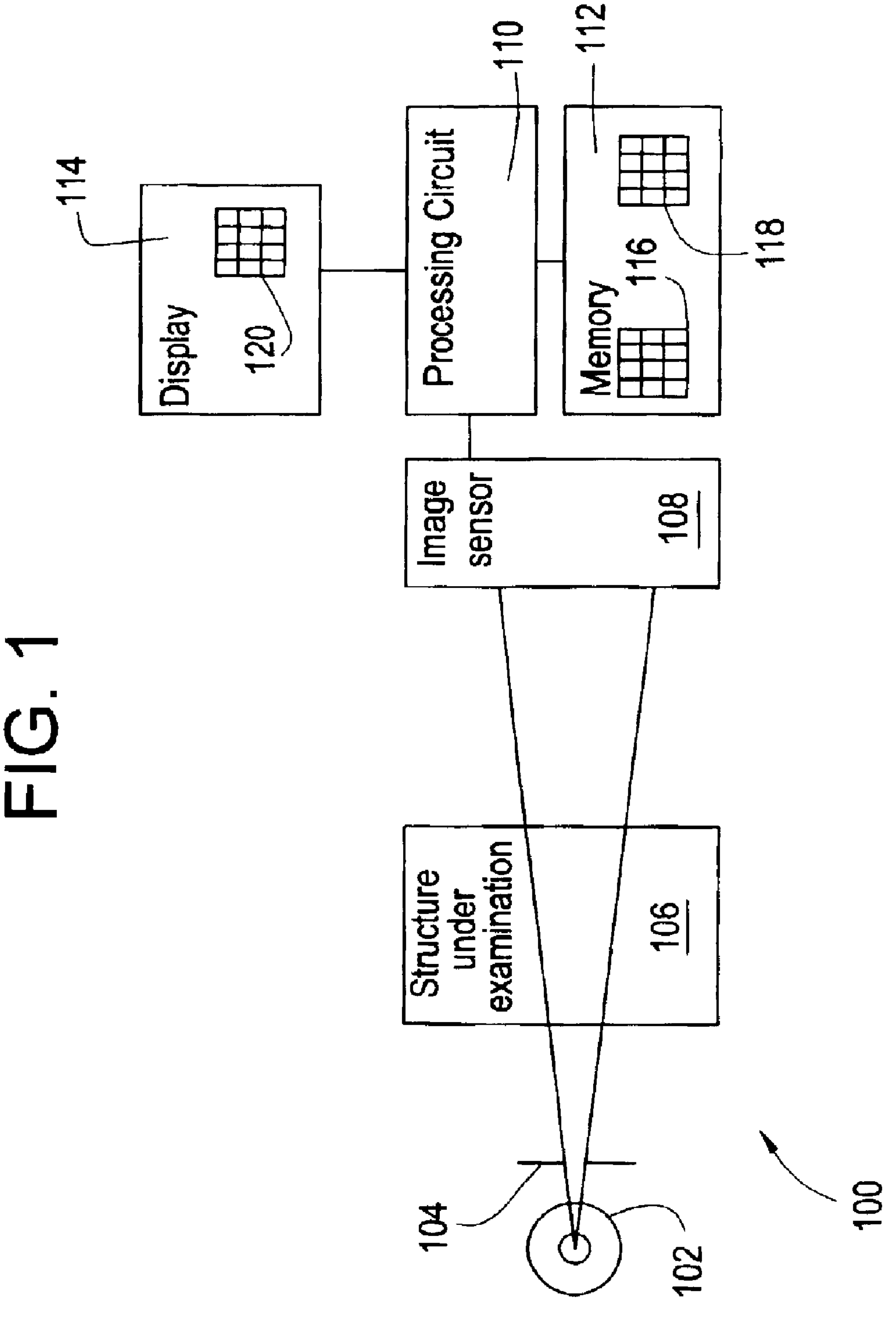
FIG. 1 illustrates a high level diagram of an x-ray imaging system.

Turning now to FIG. 1, that figure illustrates an x-ray imaging system 100. The imaging system 100 includes an x-ray source 102 and a collimator 104, which subject structure under examination 106 to x-ray photons. As examples, the x-ray source 102 may be an x-ray tube, and the structure under examination 106 may be a human patient, test phantom or other inanimate object under test.

The x-ray imaging system 100 also includes an image sensor 108 coupled to a processing circuit 110. The processing circuit 110 (e.g., a microcontroller, microprocessor, custom ASIC, or the like) couples to a memory 112 and a display 114. The memory 112 (e.g., including one or more of a hard disk, floppy disk, CDROM, EPROM, and the like) stores a high energy level image 116 (e.g., an image read out from the image sensor 108 after 110–140 kVp 5 mAs exposure) and a low energy level image 118 (e.g., an image read out after 70 kVp 25 mAs exposure). The memory 112 also stores instructions for execution by the processing circuit 110, to cancel certain types of structure in the images 116–118 (e.g., bone or tissue structure). A structure cancelled image 120 is thereby produced for display.

Figure 2:
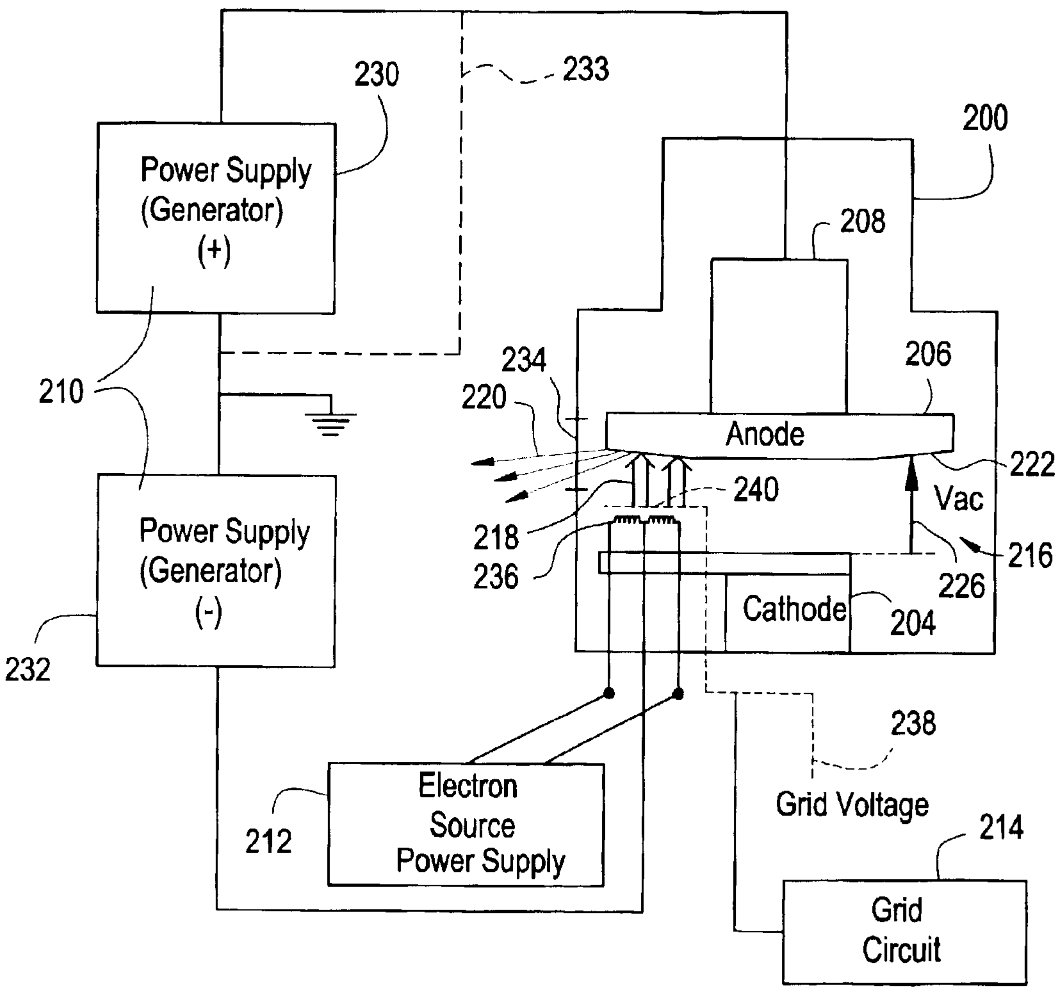
FIG. 2 is a schematic illustration of an exemplary embodiment of a pulsed power supply including a conventional electron source power supply and a grid circuit in operable communication with an x-ray tube for generating pulsed x-ray radiation.

Referring to FIG. 2, an x-ray tube 200 for use as x-ray source 102 is shown with a cathode 204, anode 206 and frame 208 having a dielectric insulator shown generally at 216, all of which are disposed inside X-ray tube 200. FIG. 2 also illustrates exemplary components that control the x-ray exposure; a main power supply (generator) 210, power supply for the filaments or an electron source 212, and a grid circuit 214. The power supply generator 210, electron source 212, and grid circuit 214 can be used individually or in combination to generate a pulsed power input to x-ray tube 200. A method using a combination of the above exemplary components is outlined below.

In an exemplary method, pulsed tube emission current 218 is generated, which in turn generates pulsed x-ray radiation 220 from an anode target 222. The frequency, pulse width, and duty cycle of the pulsed emission current 218 is determined by the response time of the x-ray detectors, image acquisition speed and by requisite image quality.

For a current pulse of frequency (f), pulse ON-time ($T_{ON}$), pulse OFF-time ($T_{OFF}$) and period (T), the efficiency improvement factor is:

$$\text{EfficiencyImprovement Factor} = \frac{T_{ON} + T_{OFF}}{T_{ON}}$$

Figure 3:
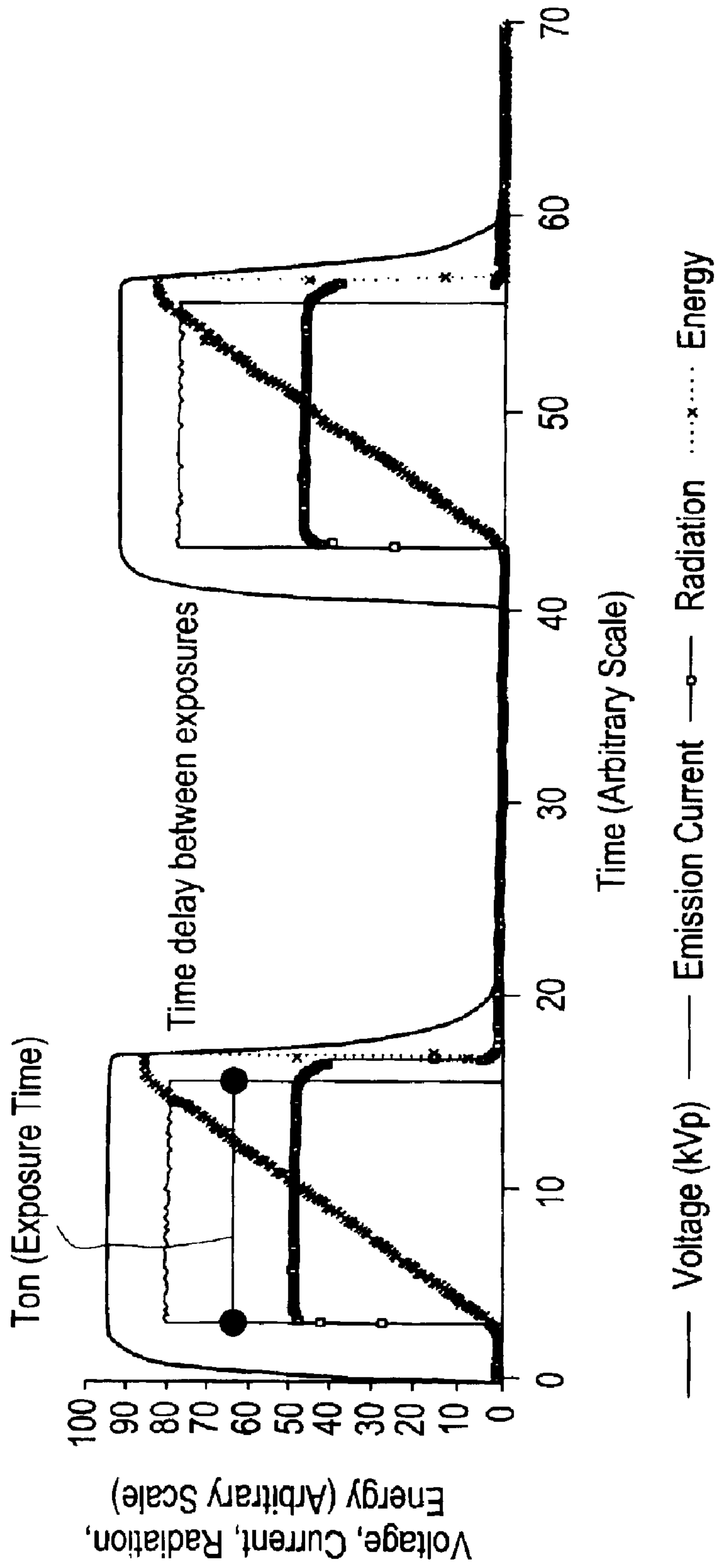
FIG. 3 is a graph illustrating current practice of DC x-ray generation plotting DC voltage, DC current and energy input.

FIG. 3 illustrates the principle of x-ray generation when the duty cycle is 100% ($T_{OFF}$=0). More specifically, FIG. 3 illustrates a DC voltage, DC current, DC x-ray radiation and energy input when the emission current is not pulsed as compared with FIG. 4.

Figure 4:
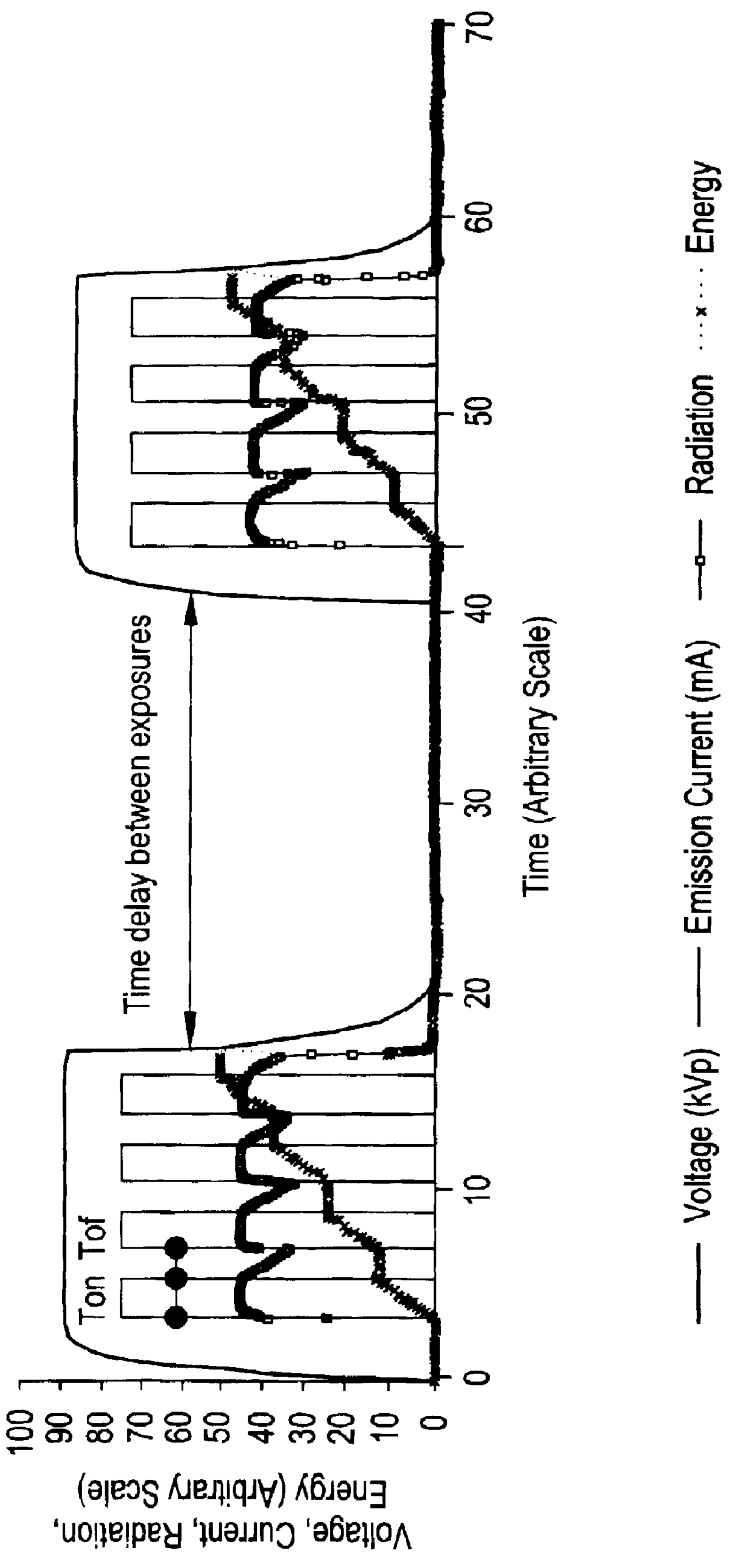
FIG. 4 is a graph of pulsed x-ray generation plotting DC voltage, pulsed current and energy input using the pulsed power supply of FIG. 2.

Referring briefly to FIG. 4, for a pulse of emission current 218 with a 50% duty cycle ($T_{ON}$=$T_{OFF}$), the efficiency improvement factor would be 2, i.e., a 100% efficiency gain over the conventional method. It will be recognized that the efficiency improvement factor is optionally interpreted as an input power reduction factor.

For instance, a CT (Computed Tomography) scanner takes 500 μs for image acquisition, and scans at a 600 μs interval. Thus, there is a time period of 100 μs within the 600 μs interval that x-ray photons are still generated but not used, which means that if a pulsed emission current 218 was used the input power would have been reduced by a factor of 16.7% (e.g., =100/600).

The exemplary methods disclosed herein assume that the human body dynamics would not change significantly in a sub-millisecond time scale. And as a result of any change in human body dynamics, any loss of image for microseconds would not affect the diagnostic procedure. With this basic assumption, producing pulsed x-ray radiation having a pulse frequency in the order of tens of kHz would not create significant loss of information. It is also assumed that the response time (especially the fall time) of x-ray detectors is slower than the response time of the emission current. In this case, x-ray signals decay at a much longer time constant and would keep their value at nearly their peak value until the next pulse arrives. FIG. 4 shows the expected voltage, current and x-ray radiation waveforms.

Still referring to FIG. 2, an exemplary method for generating a pulsed power input to x-ray tube 200 will be described. A main anode-to-cathode gap voltage 226 is pulsed at a high frequency by pulsing high vollagc power supply 210. The duration of each pulse is preferably below about one millisecond. Emission current 218 and x-ray generation 220 is controlled by pulsing the extraction voltage Vac. Modem pulsed power supply generating equipment is becoming less complex and less costly. However, at higher voltages, typically about 150 kV and higher instantaneous power requirements, generating a pulsed power supply is a challenge. For a bipolar x-ray tube design, generating a pulsed voltage for one side, typically 75 kV, is relatively less complicated and is readily available. For example, using fast high voltage switches (based on solid state switching technology) on one power supply generator 230 of power supply 210 that is connected in series with another power supply generator 232 of power supply 210, each power supply generator 230, 232 at 80 kV and 1 kA instantaneous current provides an emission current rise time of 200 ns. In an alternative embodiment still referring to FIG. 2, power supply 210 includes power supply generator 232 without power supply generator 230. In this embodiment, anode 206 is referenced to ground potential and cathode 204 is connected to a negative terminal of power supply generator 232 generally shown in phantom at 233 bypassing power supply generator 230.

Furthermore, using pulsed voltage supply 210 provides advantages where a variable voltage magnitude is desirable, for example, for spectral content variation. The spectral content of x-ray emission from a traditional thick solid target 222 can be controlled by means of two adjustable parameters: (1) electron acceleration voltage and (2) target material composition. The high power x-ray sources currently used for medical diagnostic equipment are thick high-density high Z material targets; bremsstrahlung radiation back-scatters from the target and escapes an x-ray tube insert via a low-Z window 234. The spectrum of radiation is optionally shifted to contain higher energy radiation by using a higher accelerating voltage. The pulsed power application lends itself to control of the voltage applied across the tube 200 between cathode 204 and anode 206 from pulse to pulse. Filtration for the radiation is the same, but the pulse train contains differing pulses, some pulses having higher-energy radiation. Detectors in turn can be gated to match the emission of radiation 220. Alternatively, two different detectors are optionally used, each of which is optimized for use with different energy photons. Image subtraction, known and used in the pertinent art to heighten the effect of contrast media, can be applied with more control since the spectral content of the radiation is under some modest control in this embodiment. The short time between images also implies reduced motion-related subtraction artifacts.

Like mammography, further variation in the spectral content of the x-radiation can be achieved by using two different materials on target 222. In certain mammography target designs, two separate tracks are disposed on target 222 for electron beam bombardment. Adjustment or optimization of the x-ray output is optionally made by varying the energy of the electrons striking target 222, as well as a selection of two different materials disposed on target 222. Electron beam current can then be varied to remove or compensate for differences in x-ray yield between the two materials.

It will be recognized that fast pulse-to-pulse variations in electron beam intensity assume a certain level of technology development in fast response time cathode electron emitters. Traditionally, thermionic electron emission from a filament 236 is used to generate the electrons. A large fraction of the power dissipated in the cathode simply heats the cathode structure; cathode power supplies are larger than necessary, cathode parts are hotter than they need to be, and the waste heat must be managed through astute x-ray tube design. Field emission cathodes provide an alternative approach at generating electrons without the heating power needed in a filament-based design. Field-emitter cathodes are electron sources, in the form of arrays of microfabricated sharp tips. Field emission is used to extract the electrons without heating the cathodes. As a solid-state device, the field-emission cathodes are suitable for pulsed x-ray generation. These arrays include an original Spindt-type cathode array, in which the tips are made of molybdenum.

Electron sources, such as field emission sources of fast response time, emission current (temperature) may be switched ON and OFF between two threshold values in order to control electron generation. In the case of using other sources of electrons, a similar procedure can be used to switch electrons flow ON/OFF. The practicality of this method depends on mainly the response time of the electron sources. One exemplary method that is ideally suited to this task is possible from field emission arrays (FEA) gated with modest voltages. Another exemplary method that is ideally suited to this task employs a photo-emission cathode assembly discussed later herein.

In an alternative exemplary embodiment, rapid variation of emission current 218 includes gridding using a grid voltage 238. The capacitance of cathode cups is sufficiently small so that control of emission current 218 is possible on the tens to hundreds microsecond time scale. In an exemplary embodiment, gridding is used to control electron emission current. The grid electrode 240 switches from a negative potential to cut electrons flow to that of the cathode potential to let electrons flow. Since the required grid voltage 238 is in the order of few kV, fast switching can be achieved with less complication and lower cost.

Pulsed power application of high voltage electron emission for bremsstrahlung radiation emission can also be applied to thin targets that produce x-radiation in the transmission mode. The preferred embodiment would be a thin support having multiple foils of thin target material that would spin near the electron beam being used to create the x-radiation. A choice of pulse train is key to hitting the target at the proper time, synchronized to detector operation and optimized for the particular spectral content by varying the electron beam energy.

FIG. 4 shows the operating principles for one exemplary proposed method using a pulsed grid voltage discussed above. Compared to the present practice, this method reduces the energy input and finally the temperature rise in parts of the tube. With this method the thermal limitation can be raised by the efficiency improvement factor. It will be recognized that FIG. 4 exemplifies a current that is pulsed for a sub-millisecond duration, but it is contemplated that the voltage may optionally be pulsed as well. A preferred embodiment is to pulse at high frequency the current by means of quickly changing the grid voltage. It will also be noted that gridding can be used alone or in conjunction with the other methods to pulse the emission current disclosed herein.

Figure 5:
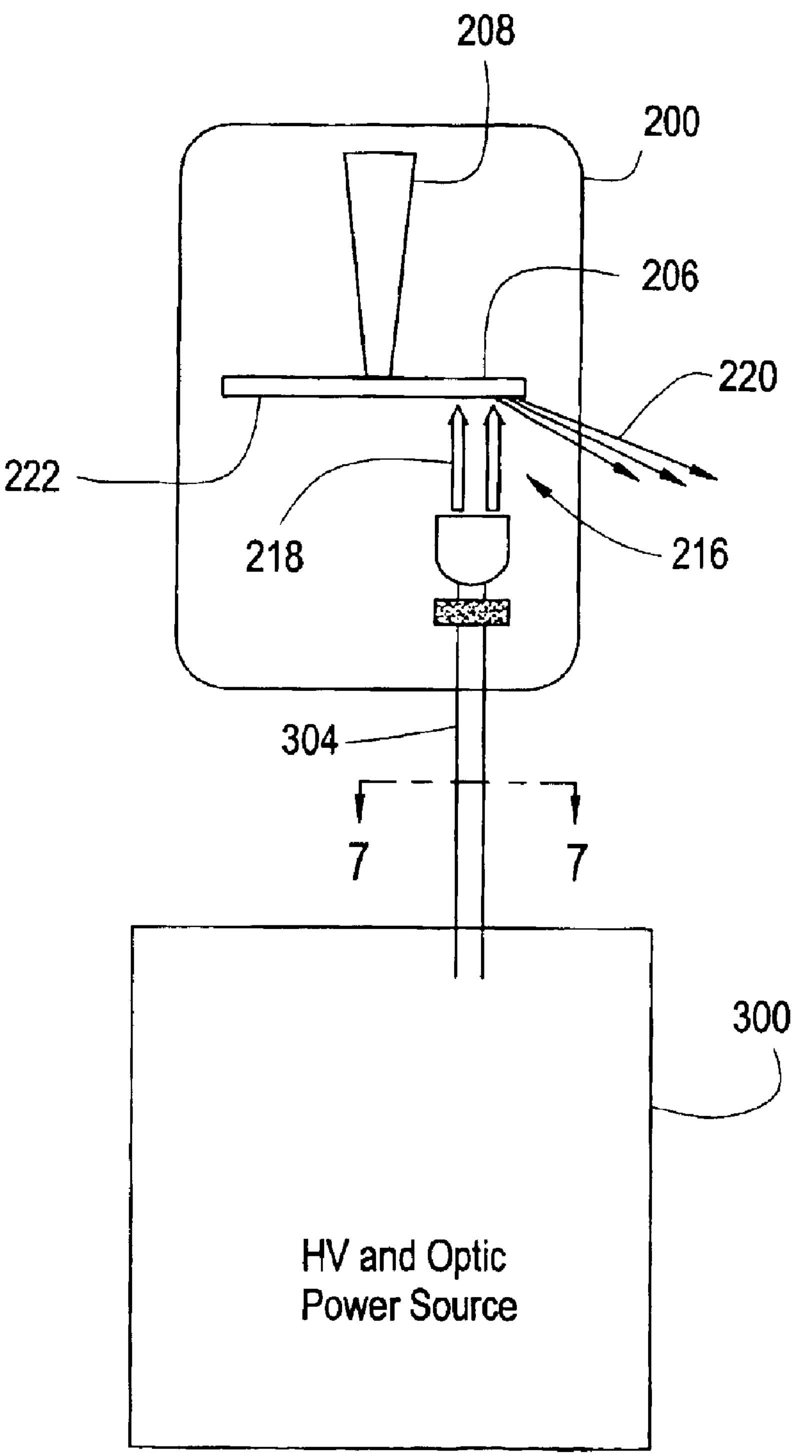
FIG. 5 is a schematic illustration of an exemplary embodiment of a power supply to supply pulsed optical and electrical energy to an x-ray tube via a single power cable.
Figure 6:
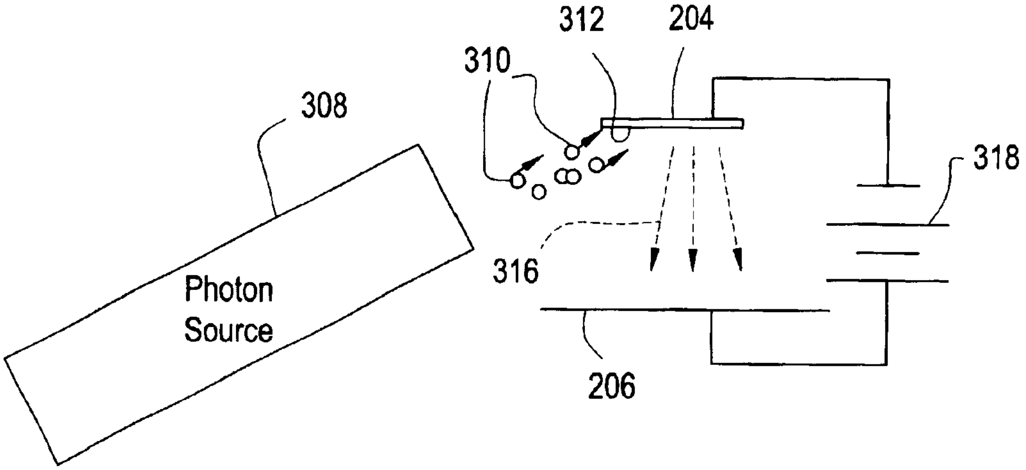
FIG. 6 is a schematic illustration of the x-ray tube of FIG. 5 illustrating a photo-emission cathode assembly responsive to a photon source incorporated with the power supply.

Referring to FIGS. 5 and 6, an exemplary apparatus and approach for generating electrons without heating power needed in a filament-base design are illustrated. The x-ray tube 200 is shown with cathode 204 having a photon triggered electron source, anode 206 and frame 208 having a dielectric insulator shown generally at 216, all of which are disposed inside X-ray tube 200. FIG. 5 also illustrates exemplary components that control the x-ray exposure; a power supply 300 configured to provide an accelerating potential via electrical energy and photons via optical energy. Power supply 300 is connected to x-ray tube 200 with a power cable 304 for providing the accelerating potential between the anode and cathode and for providing the optical energy to photo-emissive cathode 204. A method using a combination of the above exemplary components is outlined below.

In an exemplary method, pulsed tube emission current 218 is generated, which in turn generates pulsed x-ray radiation 220 from anode target 222. As before, the frequency, pulse width, and duty cycle of the pulsed emission current 218 is determined by the response time of the x-ray detectors, image acquisition speed and by requisite image quality.

Still referring to FIGS. 5 and 6, power supply 300 is configured having a photon source 308 including, but not limited to a laser, light emitting diode (LED), or other electroluminescent device to generate photons 310 directed at a prepared photo-emitting surface 312 of cathode 204. The prepared photo-emitting surface 312 of cathode 204 includes, but is not limited to, at least one of, including combinations of at least one of: clean metals, semiconductor crystals, coated metal materials, coated oxide materials, and cleaved crystal edges. Photons 310 of an appropriate energy or wavelength directed at cathode 204 result in electrons 316 emitted from cathode 204 that are attracted to anode 206 under influence of static and dynamic electromagnetic fields partially created by a bias voltage device 318 operably connected between cathode 204 and anode 206. Bias voltage device 318 is configured to maintain negative polarity on cathode 204 with respect to anode 206.

Figure 7:
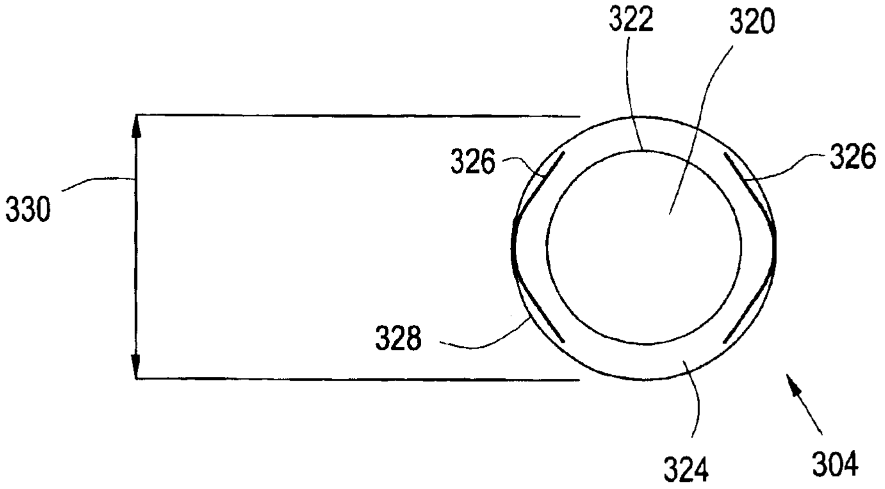
FIG. 7 is a cross sectional view of the power cable shown in FIG. 5 illustrating an electrical energy conductor and an optical energy conductor employed therein.

Referring to FIGS. 5 and 7, the size reduction of an x-ray tube is not limited to large conventional high voltage (HV) cabling. The x-ray tube is optionally a hand held device using pulsed or resonant power for both the accelerating potential and the electron source by using unique cabling 304 which incorporates the means to transfer optical energy and accelerating potential in a pulsed manner in a single cable. In addition, the use of pulsed power reduces the insulator size, weight and spacing requirements between the accelerating potential's conductors due to the voltage-time effect in dielectric materials.

In an exemplary embodiment, a cross-section of power cabling 304 is illustrated in FIG. 7. Power cabling 304 includes a waveguide 320 for transferring optical energy generated by photon source 308 to photo-emitting surface 312 of cathode 204. Waveguide 320 is preferably an optical fiber bundle 322. Waveguide 320 is encased in an insulation material 324 having two electrical conductors 326 therein for transfer of electrical energy from power supply 300 to cathode 204 providing the accelerating potential between cathode 204 and anode 206.

In an exemplary embodiment, each electrical conductor 326 is configured having a geometry designed to maximize the skin effect, and the geometry of the cable. The cable length is tuned either mechanically or electrically in a manner that an antenna would be tuned. It will be recognized that optimization and utilization of the transmission line effect of a pulse train source of power is well within the common knowledge of one skilled in the pertinent art, such that the cable is tuned to allow maximum voltage at the x-ray tube. The integration of these unique elements result in the ability to produce an x-ray tube in smaller sizes, much smaller than the traditional devices since the cabling can be a single power cable having a very small diameter. This would allow an x-ray tube to be a hand held or hand manipulated device to allow greater opportunity for diagnosis. If needed, an array of these tubes could be utilized to incorporate a larger area or higher penetrating power.

More specifically and still referring to FIG. 7, each electrical conductor 326 is configured to maximize the skin effect by realizing the tendency of alternating current to flow near the surface of a conductor, thereby restricting the current to a small part of the total cross-sectional area and increasing the resistance to the flow of current. The skin effect is caused by the self-inductance of the conductor, which causes an increase in the inductive reactance at high frequencies, thus forcing the carriers, i.e., electrons, toward the surface of the conductor. At high frequencies, the circumference is the preferred criterion for predicting resistance than is the cross-sectional area. The depth of penetration of current can be very small compared to the diameter. In an exemplary embodiment, each conductor 326 is configured as a substantially thin planar conductor 328 extending a length of cable 304. The planar conductor 328 is curved around a portion of the circumference of the fiber optic bundle 322 having insulation material between bundle 322 and conductor 328. The conductor 328 is curved around bundle 322 to minimize a diameter 330 of cable 304. Conductor 328 is preferably made from an electrically conductive metal selected to optimize the skin effect. Suitable conductive metals include, but are not limited to copper, nickel, tin, gold, including formulations of any or all of the above.

One of the most immediate advantages of using pulsed power application with x-ray tubes will be an improvement in the efficiency of x-ray tubes. Pulsed power application will facilitate development of x-ray tubes that can handle higher power. With an increased efficiency factor, together with the unique cabling disclosed herein, high power tubes can be more compact and patient dose management is improved by eliminating unnecessary exposure. Moreover, when the x-ray tube efficiency (power handling capability) increases, the generator power requirement reduces. This in turn means a compact and lower cost generator.

High voltage stability of x-ray tubes can be improved by applying short duration pulses and reducing the temperature of the target. Dielectric strength of insulators improves as the pulse width of the applied voltages diminish. By lowering the track (target) temperatures, the probability of spit activity (dielectric breakdown) can be reduced. It will be recognized by those skilled in the pertinent art that high voltage stability at higher current is one of the most critical x-ray tube design and performance issues.

Furthermore, when the primary pulse is generated using a pulsed high voltage supply, the use of pulsed high voltage supply brings an added advantage in improving high voltage stability of x-ray tubes. More specifically, the dielectric strength of the insulation system is in most cases dependent on the duration of the voltage application, i.e., insulators have a higher dielectric strength for short duration pulses. This means that for the same geometry or dielectric spacing, a higher voltage can be applied or for the same voltage level the spacing can be reduced.

The exemplary methods disclosed herein illustrate that by using pulsed power technology in x-ray tubes to generate an accelerating potential and photons, x-ray generation is synchronized with the required x-ray output for image recording. These methods include the use of sampled x-ray detection followed with signal recovery techniques. By eliminating the unnecessary photon generation when they are not needed or have minimum effect on image quality, the average heat generated can be reduced significantly. This in turn brings an improvement to the efficiency or power handling capability of the tube.

As the speed of the detector's response time and image acquisition systems improves very rapidly, the duration for x-ray generation becomes shorter. This creates an excellent opportunity to use pulsed power technology to generate x-ray photons in the form of single pulse or multiple sampled pulses.

Depending on the response time (rise and fall time) of the x-ray detector and image acquisition time, the pulse frequency, width, and duty cycle can be optimized to produce x-ray radiation output for a required image quality. Powerful digital signal processors with fast image manipulation and processing algorithms are available to produce clear images from sampled x-ray outputs with very little or no loss of critical information.

Pulsed voltage can also be used to vary the spectral content of the x-radiation by varying the amplitude of the pulse voltage. This method of varying the spectral content with pulsed voltage can be used in applications where x-radiation of more than one spectral content is required.

In conclusion, the method and apparatus using pulsed power application for generating pulsed emission current for producing similarly pulsed x-ray radiation results in improved efficiency in x-ray tubes; improved patient dose management; improve high voltage stability; and provides a means of varying spectral content. Further, the method an apparatus using the unique cabling for transferring optical energy and electrical energy in a single power cable to an x-ray tube results in a more compact assembly for generation of x-rays.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A pulsed power application system for an x-ray tube comprising:

an x-ray tube having an anode and cathode, said x-ray tube configured for diagnostic imaging;

a power supply configured to provide optical energy and an anode-to-cathode gap voltage via electrical energy, said anode-to-cathode gap voltage is greater than 150 kV, wherein said optical energy and said gap voltage are pulsed resulting in a pulsed x-ray radiation; and a means for transferring said optical energy and said electrical energy from said power supply to said x-ray tube.

2. The pulsed power application system of claim 1, wherein said optical energy and said gap voltage is pulsed, said gap voltage is pulsed by pulsing an output voltage of said power supply.

3. The pulsed power application system of claim 1, wherein the x-ray tube is bipolar and said anode is connected to a positive terminal of a first power supply of said power supply and said cathode is connected to a negative terminal of a second power supply of said power supply, remaining terminals of said first and second power supplies are referenced to ground.

4. The pulsed power application system of claim 1, wherein the x-ray tube is bipolar and said anode is referenced to ground potential and said cathode is connected to a negative terminal of said power supply.

5. The pulsed power application system of claim 1, wherein said optical energy is generated by one of a laser, an LED, and an electroluminescent device in operable communication with said power supply and configured to generate pulsed photon energy at a suitable wavelength to optimize electron emission from an electron source.

6. The pulsed power application system of claim 1, wherein said cathode includes a surface configured as an electron source to generate electrons triggered by photons directed at said surface, said photons generated from said optical energy.

7. The pulsed power application system of claim 6, wherein said surface of said cathode is a photo-emitting surface including at least one of clean metals, semiconductor crystals, coated metal materials, coated oxide materials, and cleaved crystal edges.

8. The pulsed power application system of claim 7, wherein said electron source includes a field emission array (FEA).

9. The pulsed power application system of claim 8, wherein said field emission array (FEA) includes a Spindt-type field emission array.

10. The pulsed power application system of claim 1, wherein said means for transferring said optical energy and said electrical energy from said power supply to said x-ray tube is a single cable, said single cable comprising:

a waveguide configured to transfer optical energy to the x-ray tube, an electrical conductor configured to transfer electrical energy to the x-ray tube, said electrical conductor surrounding at least a portion of said waveguide along a length of the cable; and an insulation material disposed between said waveguide and said electrical conductor, said insulation material surrounding said waveguide and said electrical conductor.

11. An x-ray tube adapted to generate pulsed x-ray radiation comprising:

a frame;

an anode disposed in said frame;

a cathode corresponding with said anode disposed in said frame;

a power supply configured to provide optical energy and an anode-to-cathode gap voltage via electrical energy, said anode-to-cathode gap voltage is greater than 150 kV, wherein said optical energy and said gap voltage are pulsed resulting in a pulsed x-ray radiation; and a means for transferring said optical energy and said electrical energy from said power supply to said x-ray tube, said x-ray tube configured for diagnostic imaging.

12. The x-ray tube of claim 11, wherein said optical energy and said gap voltage is pulsed, said gap voltage is pulsed by pulsing an output voltage of said power supply.

13. The x-ray tube of claim 11, wherein said power supply includes a positive terminal in electrical communication with said anode and a negative terminal in electrical communication with said cathode, wherein said power supply generates a pulsed emission current resulting in the pulsed x-ray radiation from said anode.

14. The x-ray tube of claim 11, wherein the x-ray tube is bipolar and said anode is connected to a positive terminal of a first power supply of said power supply and said cathode is connected to a negative terminal of a second power supply of said power supply, remaining terminals of said first and second power supply are referenced to ground.

15. The x-ray tube of claim 11, wherein said optical energy is generated by one of a laser, an LED, and an electroluminescent device in operable communication with said power supply and configured to generate pulsed photon energy at a suitable wavelength to optimize electron emission from an electron source.

16. The x-ray tube of claim 11, wherein said cathode includes a surface configured as an electron source to generate electrons triggered by photons directed at said surface, said photons generated from said optical energy.

17. The x-ray tube of claim 16, wherein said surface of said cathode is a prepared photo-emitting surface including at least one of clean metals, semi-conductor crystals, coated metal materials, coated oxide materials, and cleaved crystal edges.

18. The x-ray tube of claim 17, wherein said electron source includes a field emission may (FEA).

19. The x-ray tube of claim 18, wherein said field emission array (FEA) includes a Spindt-type field emission array.

20. The pulsed power application system of claim 11, wherein said means for transferring said optical energy and said electrical energy from said power supply to said x-ray tube is a single cable, said single cable comprising:

a waveguide configured to transfer optical energy to the x-ray tube, an electrical conductor configured to transfer electrical energy to the x-ray tube, said electrical conductor surrounding at least a portion of said waveguide along a length of the cable; and an insulation material disposed between said waveguide and said electrical conductor, said insulation material surrounding said waveguide and said electrical conductor.

21. A method to reduce the size for improving the efficiency of operation in x-ray tubes, the method comprising:

configuring a power supply to provide optical energy and electrical energy;

connecting said power supply to an x-ray tube configured for diagnostic imaging with a means for -transferring said optical energy and said electrical energy from said power supply to the x-ray tube, the x-ray tube having an anode and a cathode disposed in the x-ray tube receptive to a gap voltage therebetween via said electrical energy from said power supply, said gap voltage is greater than 150 kV;

pulsing said gap voltage; and generating a pulsed x-ray radiation from said anode.

22. The method of claim 21, wherein said means for transferring said optical energy and said electrical energy from said power supply to said x-ray tube is a single cable, said single cable comprising:

a waveguide configured to transfer optical energy to the x-ray tube, an electrical conductor configured to transfer electrical energy to the x-ray tube, said electrical conductor surrounding at least a portion of said waveguide along a length of the cable; and an insulation material disposed between said waveguide and said electrical conductor, said insulation material surrounding said waveguide and said electrical conductor.

23. A pulsed power application system for an x-ray tube comprising:

an x-ray tube having an anode and cathode, said x-ray tube configured for diagnostic imaging;

a power supply configured to provide optical energy generating photons and electrical energy generating an anode-to-cathode gap voltage said anode-to-cathode gap voltage is greater than 150 kV; and a pulsing means for pulsing said photons and said gap voltage resulting in a pulsed x-ray radiation;

a means for transferring said optical energy and said electrical energy from said power supply to said x-ray tube.

24. The pulsed power application system of claim 23 wherein said pulsing means includes at least one of, and includes combinations of at least one of:

pulsing an output voltage of said power supply;

applying a grid voltage to control electron emission current; and switching one of a switchable electron source in operable communication with the cathode.

25. A power supply cable for an x-ray tube comprising:

a waveguide configured to transfer optical energy to the x-ray tube;

an electrical conductor configured to transfer electrical energy to the x-ray tube, said electrical conductor surrounding at least a portion of said waveguide along a length of the cable, said electrical conductor being configured to use a transmission line effect of a pulse train of power to maximize voltage at the x-ray tube, said electrical conductor being, configured as a portion of a cylindrical wall disposed proximate a periphery of the cable to optimize a skin effect for pulsed power current transmission through said electrical conductor; and an insulation material disposed between said waveguide and said electrical conductor, said insulation material surrounding said waveguide and said electrical conductor.

26. The cable of claim 25, wherein said electrical conductor includes two electrical conductors surrounding said at least a portion of said waveguide, said two electrical conductors configured to optimize said skin effect for pulsed power current transmission through said two electrical conductors.

27. The cable of claim 26, wherein each of said two electrical conductors is configured as a portion of a cylindrical wall disposed proximate a periphery of the cable to optimize said skin effect.

28. The cable of claim 25, wherein said waveguide includes one of an optical fiber and a bundle of optical fibers.

29. The cable of claim 25, wherein said waveguide is made from one of a plastic and a glass.

30. A method to reduce the size of a power cable supplying an x-ray tub, the method comprising:

employing an optical waveguide to transfer optical energy to an electron source triggered by photon energy to initiate release of electrons;

configuring an accelerating potential conductor taking into account skin effect to reduce the thickness thereof and circumferentially disposing about said waveguide, wherein said conductor is configured to use a transmission line effect of a pulse train of power to maximize voltage at the x-ray tube and configured as a portion of a cylindrical wall disposed proximate a periphery of the cable to optimize a skin effect for pulsed power current transmission through said electrical conductor, and disposing an insulating material between said conductor and said waveguide, said insulation material surrounding said conductor and a periphery of said waveguide.

* * * * *

UNITED STATES PATENT AND TRADEMARK OFFICE

CERTIFICATE OF CORRECTION

PATENT NO. : 6,882,703 B2
DATED : April 19, 2005
INVENTOR(S) : John Scott Price et al.

It is certified that error appears in the above-identified patent and that said Letters Patent is hereby corrected as shown below:

Column 4,
Line 34, after “high”, delete “vollagc” and insert therefor -- voltage --.

Column 10,
Line 61, after “emission”, delete “may” and insert therefor -- array --.

Column 11,
Line 17, after “for”, delete “-transferring” and insert therefor -- transferring --.

Column 12,
Line 15, after “being”, delete “,”; and
Line 39, after “x-ray”, delete “tub” and insert therefor -- tube --.

Signed and Sealed this

Twenty-third Day of August, 2005

JON W. DUDAS
*Director of the United States Patent and Trademark Office*